(12) United States Patent
Zuttah

(10) Patent No.: US 10,822,673 B1
(45) Date of Patent: Nov. 3, 2020

(54) ARSENIC REMOVAL FROM LEAD CONCENTRATE BY OZONE TREATMENT AND REVERSE FLOTATION

(71) Applicant: American Air Liquide, Inc., Fremont, CA (US)

(72) Inventor: Sylvester Zuttah, Bear, DE (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 16/716,630

(22) Filed: Dec. 17, 2019

(51) Int. Cl.
  *B03D 1/02* (2006.01)
  *B03D 1/06* (2006.01)
  *B03D 1/002* (2006.01)
  *C22B 1/11* (2006.01)

(52) U.S. Cl.
  CPC .............. *C22B 1/11* (2013.01); *B03D 1/002* (2013.01); *B03D 1/06* (2013.01); *B03D 1/02* (2013.01); *B03D 2203/02* (2013.01)

(58) Field of Classification Search
  CPC . B03D 1/02; B03D 1/06; B03D 1/002; B03D 2203/02; C22B 1/11
  USPC ....................................... 209/164, 166, 167
  See application file for complete search history.

(56) References Cited

U.S. PATENT DOCUMENTS

| | | | | |
|---|---|---|---|---|
| 2,154,092 A | * | 4/1939 | Hunt | B03D 1/002 209/167 |
| 2,342,277 A | * | 2/1944 | Herkenhoff | B03D 1/002 209/167 |
| 5,879,542 A | * | 3/1999 | Hoecker | B03D 1/002 209/166 |
| 5,992,640 A | * | 11/1999 | Clark | B03D 1/02 209/166 |
| 7,004,326 B1 | | 2/2006 | Dai et al. | |
| 7,152,741 B2 | | 12/2006 | Jara et al. | |
| 8,685,350 B2 | | 4/2014 | Okamoto et al. | |
| 9,885,095 B2 | * | 2/2018 | Tomlinson | C22B 3/44 |

FOREIGN PATENT DOCUMENTS

| | | |
|---|---|---|
| CN | 102049352 | 5/2011 |
| EP | 2 506 979 | 9/2018 |
| RU | 2 366 514 | 11/2008 |
| RU | 2 397 025 | 8/2010 |
| WO | WO 2013 173914 | 11/2013 |

\* cited by examiner

*Primary Examiner* — Thomas M Lithgow
(74) *Attorney, Agent, or Firm* — Yan Jiang

(57) ABSTRACT

Method for removing arsenic mineral from a lead concentrate by reverse flotation with an ozone pre-treatment. The method comprises the steps of: receiving a slurry of the lead concentrate that has previously undergone flotation processes, bubbling ozone into the slurry of the lead concentrate to remove reagents used in previous flotation processes, adding a sulfide salt to the slurry to depress lead mineral, adding an alkali to increase the pH of the slurry, adding a collector and then a frother to the slurry for a reverse flotation processing and floating the arsenic mineral out of the lead mineral to obtain a now-purified lead concentrate.

20 Claims, 2 Drawing Sheets

ARSENIC REMOVAL FROM LEAD CONCENTRATE BY OZONE TREATMENT AND REVERSE FLOTATION

FIELD OF THE INVENTION

The present invention relates to methods and processes of sulfide minerals separation by froth flotation, in particular, for removing arsenic from a slurry of a lead concentrate using ozone as an oxidizing agent.

BACKGROUND

Production of base metals (copper, zinc, nickel, lead, etc.) or precious metals (gold, silver, platinum, etc.) from mineral deposits includes preliminary processes such as flotation. The mineral concentrate produced from the flotation process contains generally impurity elements that are penalized when the concentrate is sold to smelters for further processing. Arsenic is one of the penalty elements with relatively high penalty charges in the mining industry. Removing arsenic from the final flotation concentrate will help mining companies avoid or reduce penalty charges and increase their revenue. Current industry practices consist of removing arsenic earlier in the processing before the final concentrate is generated.

A common industry practice is to use anions to depress the arsenic-containing mineral at early stages of the flotation process, before the final concentrate is produced. Cyanide ($CN^-$) or hydrosulfide ($HS^-$) is one of the most used anions to depress and remove arsenic and iron in flotation process. When a final arsenic content is still high, blending is sometimes practiced, where the concentrates with high arsenic content are mixed together with those of low arsenic content, in order to generate a concentrate with an overall acceptable arsenic impurity.

Other methods, though not common or not commercialized, include depressing the arsenic mineral with thiosulfate or strong oxidizing agents such as potassium permanganate or hydrogen peroxide. Arsenic and other impurities are sometimes removed through hydrometallurgical processes. Even though successful, they are usually carried out in corrosive environments and can require high ownership costs.

In the mining industry, a first flotation separation step called a rougher flotation, consists of floating several minerals of interest out of the slurry, thereby producing a bulk concentrate. This multi-metal concentrate further proceeds through a selective flotation stage where one mineral type is floated at a time, while the remaining is depressed. The procedure is repeated until a final concentrate is produced for each mineral type. One or more cleaning stages could be required to reach the desired purity for the final concentrate. For a typical polymetallic ore containing three (3) mineral types, three (3) final concentrates will be produced. Impurities such as traces of arsenic, antimony or bismuth are removed at the cleaning stages before the final concentrate.

A first step before trying to separate different mineral types present in a lead concentrate is to remove the remaining of previously used collector from the minerals surface. Thermal and chemical approaches have been proposed, that is, the concentrate, as a slurry, is either heated to near water boiling point, or a strong oxidizing agent can be added at room temperature.

U.S. Pat. No. 7,152,741 issued to Jara et al. discloses the use of ozone to remove common residual collectors from sulfide minerals surfaces, such as, xanthogenate and dithiophosphate. The sulfide minerals disclosed by Jara et al, including sphalerite (zinc), chalcopyrite (copper) and pentlandite (nickel) concentrates, and iron impurities in the concentrates were depressed through a conventional flotation.

Exemplary separation of impurity minerals from the lead concentrate include: (1) WO2013173914 to Dixon et al., which discloses arsenic recovery from copper-arsenic sulfides; (2) CN102049352 to Li et al., which discloses a mineral processing technology for polymetallic sulfide ore containing arsenic, copper and zinc; (3) RU2366514, which discloses a method of arsenides inhibition during flotation of multi-sulfide minerals; (4) RU2397025, which discloses a method for separation of pyrite and arsenic pyrite; (5) U.S. Pat. No. 7,004,326, which discloses arsenide depression in flotation of multi-sulfide minerals; (6) EP2506979, which discloses separation of copper minerals from pyrite using air-metabisulfite treatment; and (7) U.S. Pat. No. 8,685,350, which discloses a method for separating arsenic mineral from copper-bearing material with high arsenic grade.

The market target of arsenic content is 0.5% or less without penalty charges. The arsenic content within 0.5% to 1.0% would receive the lowest penalty. However, the penalty charges increase significantly when the arsenic content is over 1.0%, Current industry practices are not always sufficient to reduce the arsenic content in the final lead concentrates to meet the market target of 0.5% or the lowest penalty range 0.5% to 1.0%; and consequently, paying penalty charges are often unavoidable. Thus, a need remains for effective removal of impurities from the lead concentrate to meet at least the lowest penalty range.

SUMMARY

There is disclosed a method for removing arsenic mineral from a lead concentrate by reverse flotation with an ozone pre-treatment. In one embodiment, the method can include the steps of: receiving a slurry of the lead concentrate that has previously undergone flotation processes, bubbling ozone into the slurry of the lead concentrate to remove reagents used in previous flotation processes, adding a sulfide salt to the slurry to depress lead mineral, adding an alkali to increase the pH of the slurry, adding a collector and then a frother to the slurry for a reverse flotation processing, and floating the arsenic mineral out of the lead mineral to obtain a now-purified lead concentrate.

In some embodiments, the reagents used in the previous flotation processes include Aerophine® 3418A.

In some embodiments, the sulfide salt is selected from NaSH, $Na_2S$, $SO_2$ gas, or combination thereof.

In some embodiments; the alkali is lime.

In some embodiments, the redox potential of the slurry after the step b) of adding the sulfide salt is from about −500 mV to about −300 mV.

In some embodiments, the redox potential of the slurry after the step b) of adding the sulfide salt is from about −450 mV to about −350 mV.

In some embodiments, the pH of the slurry after the step c) of adding the alkali is between about 9.0 and about 11.5.

In some embodiments, the pH of the slurry after the step c) of adding the alkali is between about 10.0 and about 11.0.

In some embodiments, the pH of the slurry after the step c) of adding the alkali is between about 9.5 and about 11.0.

In some embodiments, the pH of the slurry after the step c) of adding the alkali is between about 10.0 and about 11.0.

In some embodiments, the collector is a short carbon-chain anionic collector.

In some embodiments, the short carbon-chain anionic collector comprises 1 to 6 carbon atoms (i.e., $C_1$ to $C_6$).

In some embodiments, the short carbon-chain anionic collector is PEX.

In some embodiments, the frother is MIBC.

In some embodiments, the arsenic mineral is arsenopyrite (FeAsS).

In some embodiments, the lead mineral is galena (PbS) that contains silver.

In some embodiments, the lead mineral is galena (PbS) that does not contain silver.

In some embodiments, the method further comprises the step of retaining the slurry for a contact time with ozone sufficient in length to maintain the slurry have no more foaming appears at the surface during the step a) of bubbling ozone gas into the slurry.

In some embodiments, the contact time is about 10 to about 20 minutes.

In some embodiments, the method further comprises the step of adding $N_2$ or sulfite salts to the slurry after the step of b) to de-aerate the slurry and keep a dissolved oxygen concentration in the slurry less than about 1 mg/L.

In some embodiments, the dissolved oxygen concentration in the slurry is less than about 0.5 mg/L.

In some embodiments, an arsenic content in the now-purified lead concentrate is about 0.66% or less.

There is also disclosed a method for removing arsenic mineral from a lead concentrate by reverse flotation with an ozone pre-treatment, the method comprising the steps of: receiving a slurry of the lead concentrate that has previously undergone flotation processes, bubbling ozone into the slurry of the lead concentrate to remove Aerophine® 3418A used in previous flotation processes, adding NaHS to the slurry to depress lead mineral, adding lime to increase the pH of the slurry, adding PEX and then MIBC to the slurry for a reverse flotation processing and floating the arsenic mineral out of the lead mineral to obtain a now-purified lead concentrate.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
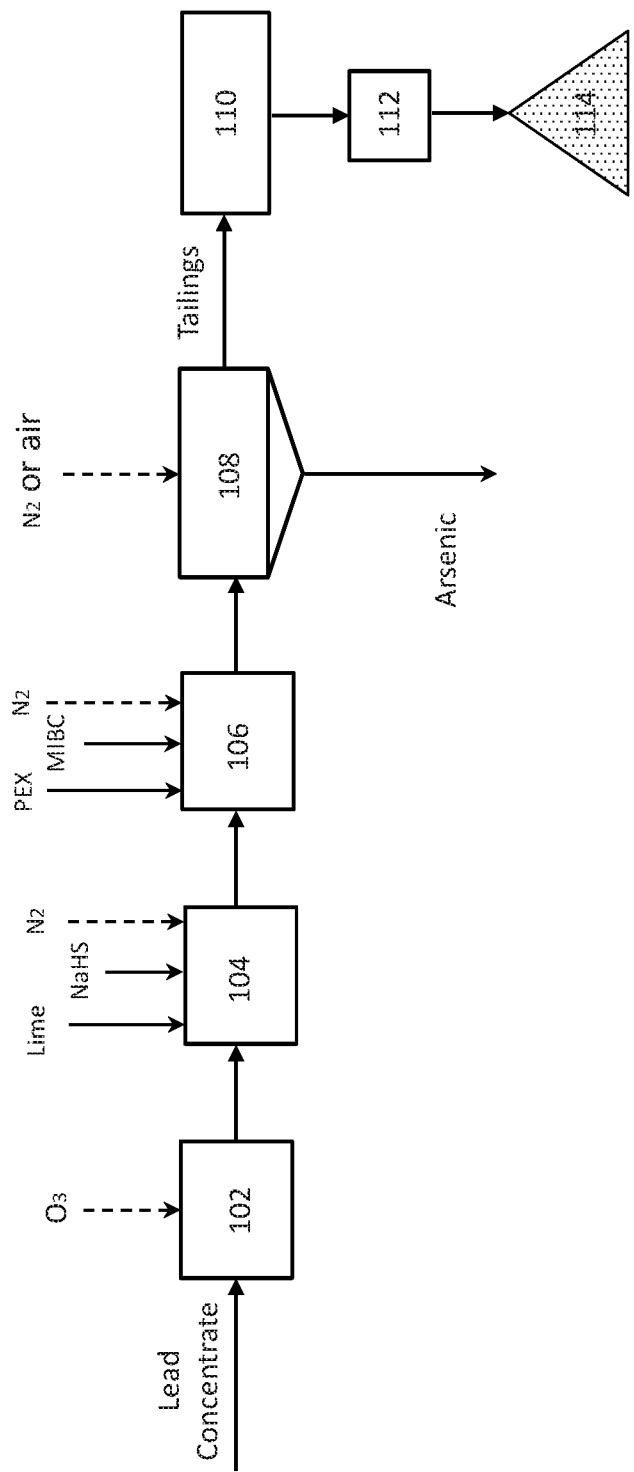
FIG. 1 shows the results achieved by the disclosed methods.

Disclosed are methods and processes for removing arsenic mineral from a lead concentrate through a reverse flotation using ozone treatment, More specifically, the methods and processes disclose use of ozone as an oxidizing agent to remove residual reagents including residual collectors and frothers from a slurry of the lead concentrates that were used in previously flotation process. An exemplary of the residual collector is Aerophine® 3418A. The residual collector exists on the particles surface and exists in the water of the slurry. In the disclosed methods and processes, by removing the residual collector, sulfurizing and alkalizing the slurry, the arsenic existing in the slurry is floated out of the lead concentrate, and a now-purified lead concentrate is produced. The ozone advantageously oxidizes the previously used collector still existing on the particles surface and existing in the water of the slurry.

Here, the now-purified lead concentrate refers to an arsenic content in the lead concentrate of about 0.66% or less. The reverse flotation is a process where desired minerals are depressed, while undesired minerals are floated with the help of some reagents, as opposed to a conventional flotation where the desired minerals are floated.

Aerophine® 3418A is an aqueous solution of sodium diisobutyldithiophosphinate. Aerophine® 3418A is one of the strongest and most common collectors on the market for lead flotation. Aerophine® 3418A collector is a dithiophosphinate-type, as opposed to an existing dithiophosphate-type, such as disclosed in U.S. Pat. No. 7,152,741 issued to Jara et al. The structure of Aerophine® 3418A is as follows.

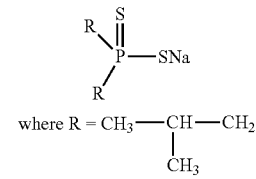

where R = $CH_3$—CH—$CH_2$
                    |
                    $CH_3$

Certain embodiments of the present invention remove one of the strongest collectors for the lead concentrate, Aerophine® 3418A, using ozone treatment. Certain embodiments of the present invention show a reverse flotation of an undesirable material arsenopyrite from the lead concentrate, following the cleaning action of ozone treatment. This is in stark contrast to the methods known heretofore, which fail to show removal or destruction of the residual collector Aerophine® 3418A from the particles surface and flotation of arsenic out of the lead concentrate through a reverse flotation for taking a final lead concentrate.

The challenges for removing arsenic mineral from a lead concentrate include i) removal of residual dithiophosphinate-type collector (such as Aerophine® 3418A) left from the previous flotation from the particles surface of the slurry; ii) the selective flotation of arsenic (the undesirable element) while depressing lead (reverse flotation), which is the desirable element.

In certain embodiments, the conditions to achieve these results can include: ozone treatment to remove residual collector, frother and other chemicals used in the previous flotation steps from the particles surface and the water, followed by an addition of sodium hydrosulfide that results in the depression of the lead mineral.

Here, the arsenic impurity may be arsenopyrite. The lead concentrate may be a galena concentrate. A pH range of 9.5 to 11.0 and a redox potential range from −500 to −350 mv are preferable for an optimum flotation of the arsenopyrite from the galena concentrate. Here the galena may contain silver or may not contain silver.

FIG. 1 is a block flow diagram of an exemplary embodiment of a system for removing arsenic mineral from a lead concentrate in a continuous mode. As shown, a slurry of a lead concentrate containing residual reagents from the previous flotation is fed to a tank 102 where ozone is injected. The lead concentrate may contain about 50% to about 90% lead and about 2% to about 10% arsenic. The residual reagents includes a collector, a frother and other chemicals. An exemplary collector is Aerophine® 3418A.

The lead concentrate can include a residual of collector such as Aerophine® 3418A from the previous flotation, which is adsorbed on particles surface of the slurry and exists in the water of the slurry. In one embodiment, the pH of the fed lead concentrate in tank 102 is approximately 9.5. The injected ozone is oxygen gas, which preferably contains 3 to 12% by weight of ozone. Ozone is injected into tank 102 for a sufficient amount of time, preferably about 10 to 20 minutes, until no more foaming appears on the slurry surface. Ozone as an oxidizing agent destroys the residual collector Aerophine® 3418A contained in the lead concentrate, thus, the particles surface of the slurry are cleaned and Aerophine® 3418A in the slurry after the ozone treatment in tank 102 is removed. After the ozone treatment, the pH of the slurry is preferably reduced to about 4 to 5, and the redox potential is in the rage of about −600 to about −200 mv.

The cleaned slurry after the ozone treatment is then pumped to tank 104 where a sulfidizing agent is added to the slurry to depress the lead mineral. The sulfidizing agent may be sodium hydrosulfide (NaHS) or any other sulfidizing agents. For example, a dosage of about 2 to about 10 kg/ton, preferably about 4 to about 6 kg/ton, of NaHS is added for about 20 min. Alternatively, a dosage of NaHS is added to the slurry until the slurry pH increases to about 8 and redox potential reaches about −500 to about −300 mv, preferably about −450 to about −350 mv.

Nitrogen gas or sulfite salts, such as $Na_2SO_3$, may also be added into tank 104 to de-aerate the slurry of the lead concentrate and maintain the dissolved oxygen in the slurry to less than about 1 mg/L, preferably less than about 0.5 mg/L. An alkali may be added to tank 104 to adjust the pH value of the slurry. The slurry pH may range from about 9.0 to about 11.5, preferably about 9.5 to about 11, more preferably about 10.0 to about 11.0. The alkali may be lime, soda ash, or sodium hydroxide. Preferably, the alkali is lime. For example, 2 ml lime is added to the slurry for 2 min.

Thereafter, the slurry is pumped to tank 106 where a suitable collector and frother are added for flotation. The suitable collectors may be a short carbon-chain anionic collector, more selective in floating arsenopyrite (small quantity) from galena (large quantity). The suitable collectors may be selected from a sulfhydryl, xanthogenate, dithiophosphate or combination thereof. Furthermore, a collector that has a carbon chain length comprising about 1 to 6 carbon atoms (i.e., $C_1$ to $C_6$) may be used. The molecules having the short carbon-chain are preferred for high selectivity of a little mass of arsenic impurity versus a large mass of lead. For example, a short carbon-chain potassium ethyl xanthate (PEX), opposed to a long carbon-chain potassium Amyl Xanthate (PAX), used herein, favorites the selectivity of the little mass of arsenic impurity versus the large mass of lead mineral.

The slurry in tank 106 is mixed with the collector PEX for a sufficient conditioning time, for example, 10-30 min, preferably 10-20 min, to allow the collector PEX to form a hydrophobic layer on arsenopyrite particles surface in the lead concentrate. After the conditioning time with the collector, a suitable frother is added. The suitable frothers can include high molecular-weight alcohols, such as methyl isobutyl carbinol (MIBC), and polyglycol ethers, such as, marketed as Dowfroth® 250, Cyanamid R65™, and Union Carbide PG400™. Other frothers known to one skilled in the art are also suitable for use. When MIBC is used as a frother, MIBC is added at a dosage of 5 to 50 g/ton, preferably 10 to 20 g/ton.

The mixing time between the slurry and the frother is about 1-30 min, preferably about 5-10 min, to allow a stable froth during concentrate recovery. $N_2$ is optional for this step. If air gets in, 02 may kill NaSH. So adding $N_2$ or any sulfite salts to remove $O_2$ may be extremely beneficial for this step.

The slurry is then pumped to flotation cell 108 for a reverse flotation where air or nitrogen is injected to float hydrophobic arsenopyrite, FeAsS (concentrate) from hydrophilic galena, PbS (tailings). A now-purified lead concentrate is recovered from the bottom of the flotation cell 108 and arsenic mineral is collected from the top of the flotation cell 108. The now-purified lead concentrate, recovered through the tailings of the flotation cell 108, containing approximately 2000 g/ton of silver and about 0.66% arsenic, is directed to the existing lead thickener 110, where the slurry density will be increased significantly before feeding to a filter press 112.

A resulting cake from the filter press 114 is then dried and stockpiled. The arsenopyrite concentrate from the flotation cell 108, containing approximately 20 g/t gold, is directed to the existing arsenopyrite line, for thickening, filtering and drying. In summary, the suitable pH for the reverse flotation disclosed herein may range from 10 to 11. The suitable redox potential for the reverse floatation disclosed herein may range from −350 to −450 mv.

In certain embodiments, the method for removing arsenic mineral from a lead concentrate can include the steps of: receiving a slurry of the lead concentrate that has previously undergone flotation processes, bubbling ozone into the slurry of the lead concentrate to remove reagents used in previous flotation processes, adding a sulfide salt to the slurry to depress lead mineral, adding an alkali to increase the pH of the slurry, adding a collector and then a frother to the slurry for a reverse flotation processing, and floating the arsenic mineral out of the lead mineral to obtain a now-purified lead concentrate.

The advantages of the disclosed methods include i) reducing or eliminating penalty charges when selling the final lead concentrate to the smelters; ii) acting as a buffering step: extra arsenic will be eliminated or reduced from the final concentrate when run-of-mine (ROM) ore with unusual high-arsenic content is accidentally processed upfront. In addition, since arsenopyrite is in the similar family to pyrite, pyrrhotite and the like, the disclosed method for removing arsenic mineral from a lead concentrate using a reverse flotation may also be applied to removing $FeS_2$ or FeS from a lead concentrate.

EXAMPLES

The following non-limiting examples are provided to further illustrate embodiments of the invention. However, the examples are not intended to be all-inclusive and are not intended to limit the scope of the inventions described herein.

Example 1

A feed material of lead concentrate having about 53% lead and about 2.7% arsenic was mixed with water to obtain about 20% solid density of a slurry of a concentrate. The pH of the slurry was about 7 to 9. Adding an ozonated gas containing 10% $O_3$ by weight into the slurry for about 20 min to remove reagents including collectors, such as Aerophine® 3418A, left from previous flotation processes. The pH was reduced to about 4 to 5. The redox potential was about −300 to −200 mv. Thereafter, adding 30 ml NaSH in to the slurry and remaining it for about 20 min. The pH was then increased to 8.3. The redox potential was −496 mv. After that, adding 2 ml lime to the slurry for about 2 minutes to toss the pH up to 10.3.

Figure 2:
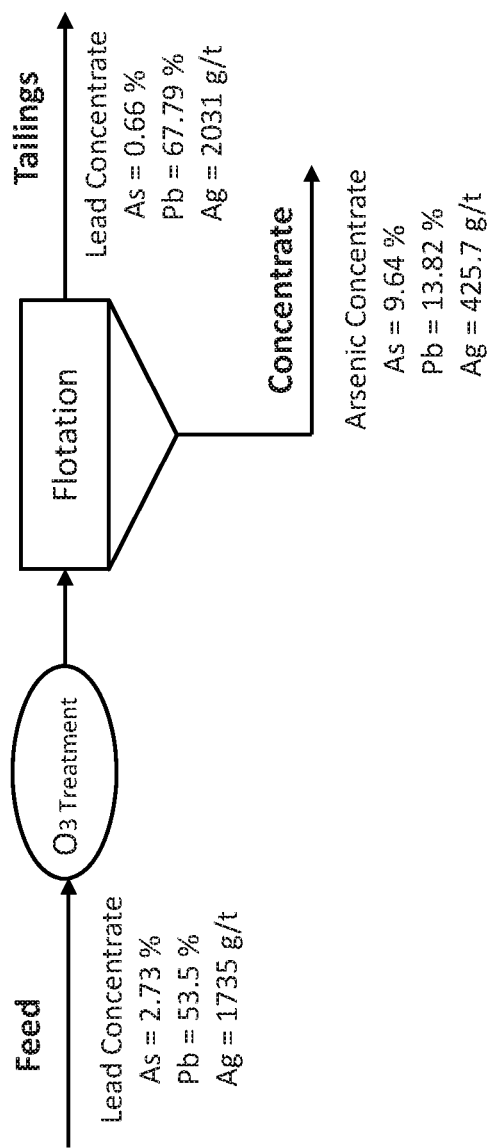
FIG. 2 shows a block flow diagram of an exemplary embodiment for arsenic removal from lead concentrate.

The redox potential was then in a range between −460 to −520 mv. Then, adding 3 ml PEX to the slurry and after 10 min adding 3 ml MIBC to the slurry for a reverse flotation process. The pH now was 10.33 and the redox potential was about 510 mv. A now-purified lead concentrate is produced from the reverse flotation containing 0.66% arsenic. The mineral contents contained in the lead concentrates before and after the reverse flotation process are shown in FIG. 2. Using ozone treatment followed by addition of sodium hydrosulfide, at alkaline condition and low redox potential, initial around 3% arsenic in the lead concentrate was reduced to around 0.66% after the reversed flotation with the ozone treatment, which is close to the industry target of 0.5% arsenic content and falls in the lowest penalty range for arsenic content of 0.5% to 1.0%.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The singular forms "a", "an" and "the" include plural referents, unless the context clearly dictates otherwise.

"About" or "around" or "approximately" in the text or in a claim means±10% of the value stated.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

Note that herein, the terms "lead concentrate" and "lead mineral" may be used interchangeably. It is understood that a lead concentrate may correspond to, or related to a lead mineral, and that the lead mineral may refer to the lead concentrate.

Ranges may be expressed herein as from about one particular value, and/or to about another particular value. When such a range is expressed, it is to be understood that another embodiment is from the one particular value and/or to the other particular value, along with all combinations within said range.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims,

What is claimed is:

1. A method for removing arsenic mineral from a lead concentrate by reverse flotation with an ozone pre-treatment, the method comprising the steps of:
    a) receiving a slurry of the lead concentrate that has previously undergone flotation processes;
    b) bubbling ozone into the slurry of the lead concentrate to remove reagents used in previous flotation processes;
    c) adding a sulfide salt to the slurry to depress lead mineral;
    d) adding an alkali to increase the pH of the slurry;
    e) adding a collector and then a frother to the slurry for a reverse flotation processing; and
    f) floating the arsenic mineral out of the lead mineral to obtain a now-purified lead concentrate.

2. The method of claim 1, wherein the reagents used in the previous flotation processes include dithiophosphinate.

3. The method of claim 1, wherein the sulfide salt is selected from NaSH, $Na_2S$, $SO_2$ gas, or combination thereof.

4. The method of claim 1, wherein the alkali is lime.

5. The method of claim 1, wherein the redox potential of the slurry after the step b) of adding the sulfide salt is from about −500 mV to about −300 mV.

6. The method of claim 1, wherein the pH of the slurry after the step c) of adding the alkali is between about 9.0 and about 11.5.

7. The method of claim 1, wherein the pH of the slurry after the step c) of adding the alkali is between about 10.0 and about 11.0.

8. The method of claim 1, wherein the collector is a short carbon-chain anionic collector.

9. The method of claim 8, wherein the short carbon-chain anionic collector comprises 1 to 6 carbon atoms (i.e., $C_1$ to $C_6$).

10. The method of claim 9, wherein the short carbon-chain anionic collector is PEX.

11. The method of claim 1, wherein the frother is MIBC.

12. The method of claim 1, wherein the arsenic mineral is arsenopyrite (FeAsS).

13. The method of claim 1, wherein the lead mineral is galena (PbS) that contains silver.

14. The method of claim 1, wherein the lead mineral is galena (PbS) that does not contain silver.

15. The method of claim 1, further comprising the step of:

retaining the slurry for a contact time with ozone sufficient in length to maintain the slurry have no more foaming appears at the surface during the step a) of bubbling ozone gas into the slurry.

16. The method of claim 15, wherein the contact time is about 10 to about 20 minutes.

17. The method of claim 1, further comprising the step of adding $N_2$ or sulfite salts to the slurry after the step of b) to de-aerate the slurry and keep a dissolved oxygen concentration in the slurry less than about 1 mg/L.

18. The method of claim 1, further comprising the step of adding $N_2$ or sulfite salts to the slurry after the step of b) to de-aerate the slurry and keep a dissolved oxygen concentration in the slurry less than about 0.5 mg/L.

19. The method of claim 1, wherein an arsenic content in the now-purified lead concentrate is about 0.66% or less.

20. A method of for removing arsenic mineral from a lead concentrate by reverse flotation with an ozone pre-treatment, the method comprising the steps of:
  a) receiving a slurry of the lead concentrate that has previously undergone flotation processes;
  b) bubbling ozone into the slurry of the lead concentrate to remove dithiophosphinate used in previous flotation processes;
  c) adding NaHS to the slurry to depress lead mineral;
  d) adding lime to increase the pH of the slurry;
  e) adding PEX and then MIBC to the slurry for a reverse flotation processing; and
  f) floating the arsenic mineral out of the lead mineral to obtain a now-purified lead concentrate.

* * * * *